United States Patent
Dalmatov et al.

(10) Patent No.: US 11,055,008 B2
(45) Date of Patent: Jul. 6, 2021

(54) MANAGING WEAR BALANCING IN MAPPED RAID STORAGE SYSTEMS

(71) Applicant: EMC IP Holding Company LLC, Hopkinton, MA (US)

(72) Inventors: Nickolay Dalmatov, St. Petersburg (RU); Michael P. Wahl, Bulverde, TX (US); Jian Gao, Beijing (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 16/052,999

(22) Filed: Aug. 2, 2018

(65) Prior Publication Data

US 2020/0042224 A1 Feb. 6, 2020

(51) Int. Cl.
*G06F 3/06* (2006.01)

(52) U.S. Cl.
CPC .......... *G06F 3/0647* (2013.01); *G06F 3/0616* (2013.01); *G06F 3/0689* (2013.01); *G06F 3/06* (2013.01)

(58) Field of Classification Search
CPC ........ G06F 3/06; G06F 3/0647; G06F 3/0616; G06F 3/0689
See application file for complete search history.

(56) References Cited

U.S. PATENT DOCUMENTS

| | | | | |
|---|---|---|---|---|
| 2008/0109601 A1* | 5/2008 | Klemm | ................. | G06F 3/0689 711/114 |
| 2012/0079318 A1* | 3/2012 | Colgrove | .............. | G06F 3/0688 711/114 |
| 2012/0254513 A1* | 10/2012 | Uehara | ................... | G06F 3/064 711/103 |
| 2017/0075583 A1* | 3/2017 | Alexander | ............ | G06F 3/0605 |
| 2018/0357535 A1* | 12/2018 | Shulkin | .................... | G06N 3/08 |

* cited by examiner

*Primary Examiner* — Masud K Khan
(74) *Attorney, Agent, or Firm* — Krishnendu Gupta; Anne-Marie Dinius

(57) ABSTRACT

A method, computer program product, and computing system for managing wear balance in a mapped RAID storage system. According to embodiments, mapped RAID extents, which are comprised of storage disk extents, are assigned to particular mapped RAID groups based on one or more parameters related to wear experienced by disk extents associated with the RAID extent. Endurance parameters are measured and can be used by machine learning modules to predict future wear levels enabling predictive wear balancing in mapped RAID storage systems. Embodiments can be used when initially forming a mapped RAID group, when adding storage to an existing mapped RAID group, or when managing the ongoing performance of a mapped RAID group or storage system.

18 Claims, 7 Drawing Sheets

| DRIVE-1 510 | | DRIVE-2 515 | | DRIVE-3 520 | | DRIVE-4 525 |
|---|---|---|---|---|---|---|
| 30 | RG2-RE1 — 512 | 50 | RG1-RE2 — 517 | 40 | RG2-RE2 — 522 | 50 | RG2-RE4 — 527 |
| 30 | RG1-RE1 — 514 | 50 | RG1-RE3 — 519 | 40 | RG2-RE3 — 524 | 50 | RG1-RE4 — 529 |

| DRIVE-5 530 | | DRIVE-6 535 | | DRIVE-7 540 | | DRIVE-8 545 |
|---|---|---|---|---|---|---|
| 30 | RG2-RE1 — 532 | 40 | RG1-RE3 — 537 | 50 | RG1-RE2 — 542 | 30 | RG2-RE4 — 547 |
| 30 | RG1-RE1 — 534 | 40 | RG1-RE3 — 539 | 50 | RG2-RE2 — 544 | 30 | RG1-RE4 — 549 |

| DRIVE-9 550 | | DRIVE-10 555 | | DRIVE-11 560 | | DRIVE-12 565 |
|---|---|---|---|---|---|---|
| 40 | RG1-RE2 — 552 | 30 | RG2-RE1 — 557 | 40 | RG2-RE2 — 562 | 50 | RG2-RE4 — 567 |
| 40 | RG2-RE3 — 554 | 30 | RG1-RE3 — 559 | 40 | RG1-RE1 — 564 | 50 | RG1-RE4 — 569 |

FIG. 5

MANAGING WEAR BALANCING IN MAPPED RAID STORAGE SYSTEMS

TECHNICAL FIELD

This disclosure relates to storage systems and methods and, more particularly, to storage systems and methods for use within high-availability data storage systems.

BACKGROUND

Storing and safeguarding electronic content is of paramount importance in modern business. Accordingly, various methodologies may be employed to protect such electronic content. One such methodology is to utilize high availability systems to reduce the likelihood of data loss. As would be expected, such high availability systems are often quite complex. Unfortunately, complex system often require complex tasks (e.g., load balancing and wear balancing) to be performed in order to maintain these systems at peak efficiency.

SUMMARY OF DISCLOSURE

In one implementation, a computer-implemented method is executed on a computing device in order to create a group of RAID groups (RG) by aggregating RAID extents (RE) with similar endurance levels and then balancing wear by moving slices of data from one RG to another RG. In some embodiments, mapped RAID extents could be assigned to a RAID group based on the endurance level of the particular RAID extent, or its underlying disk extent, being assigned. For example, in some embodiments, RAID extents having a similar endurance level could be grouped together in a RAID group.

In alternate embodiments, logical data portions can be moved from one mapped RAID group to another based on the respective endurance levels of the two RAID groups under consideration. In yet an alternate embodiment, mapped RAID extents could be relocated to alternative disk extents based on an endurance parameter associated with a particular RAID group. In yet another embodiment, portions of logical data could be moved from one mapped RAID group to another based on predictive analytics associated with future write operations, for example.

In one embodiment, there is a method for use in managing wear balancing in mapped RAID storage systems, the method comprising: determining an endurance parameter for a plurality of disk extents in a mapped RAID storage system, wherein one or more disk extents comprises a mapped RAID extent; and managing a mapped RAID group by locating one or more RAID extents within the mapped RAID group on disk extents having a similar endurance parameter.

In an alternate embodiment, there is a system for use in managing wear balancing in mapped RAID storage systems, the system comprising a processor configured to: determine an endurance parameter for a plurality of disk extents in a mapped RAID storage system, wherein one or more disk extents comprises a mapped RAID extent; and manage a mapped RAID group by locating one or more RAID extents within the mapped RAID group on disk extents having a similar endurance parameter.

In yet an additional embodiment, there is a non-transitory computer readable medium with program instructions stored thereon for performing the following acts: determine an endurance parameter for a plurality of disk extents in a mapped RAID storage system, wherein one or more disk extents comprises a mapped RAID extent; and manage a mapped RAID group by locating one or more RAID extents within the mapped RAID group on disk extents having a similar endurance parameter.

BRIEF DESCRIPTION OF THE DRAWINGS

FIG. 5 is a diagrammatic view of a portion of a mapped RAID storage system according to embodiments;

Like reference symbols in the various drawings indicate like elements.

DETAILED DESCRIPTION OF THE PREFERRED EMBODIMENTS

Figure 1:
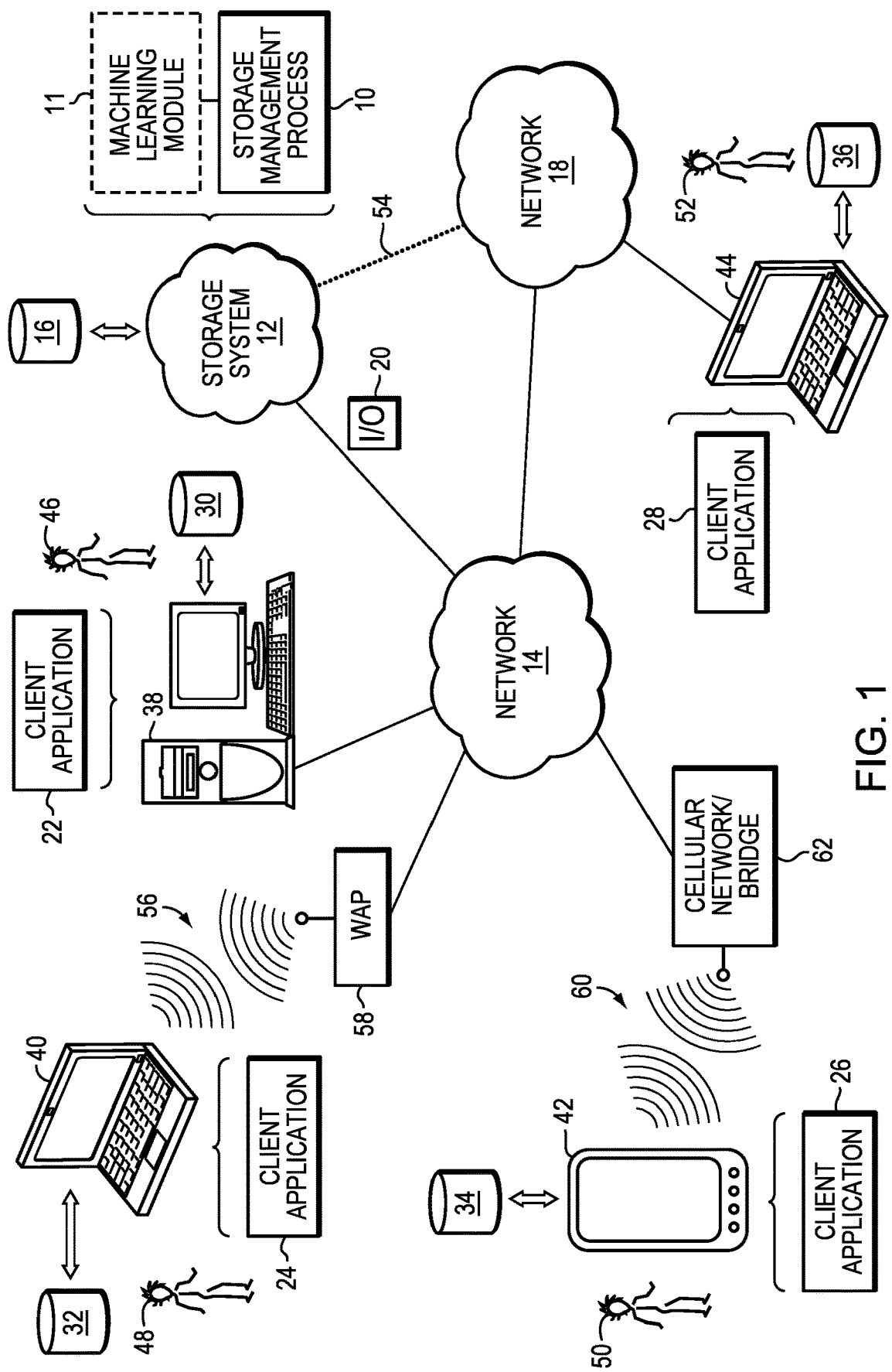
FIG. 1 is a diagrammatic view of a storage system and a storage management process coupled to a distributed computing network.

System Overview:

Referring to FIG. 1, there is shown storage management process 10 that may reside on and may be executed by storage system 12, which may be connected to network 14 (e.g., the Internet or a local area network). Examples of storage system 12 may include, but are not limited to: a Network Attached Storage (NAS) system, a Storage Area Network (SAN), a personal computer with a memory system, a server computer with a memory system, and a cloud-based device with a memory system.

As is known in the art, a SAN may include one or more of a personal computer, a server computer, a series of server computers, a mini computer, a mainframe computer, a RAID device and a NAS system. The various components of storage system 12 may execute one or more operating systems, examples of which may include but are not limited to: Microsoft Windows Server™; Redhat Linux™, Unix, or a custom operating system, for example.

The instruction sets and subroutines of storage management process 10, which may be stored on storage device 16 included within storage system 12, may be executed by one or more processors (not shown) and one or more memory architectures (not shown) included within storage system 12. Storage device 16 may include but is not limited to: a hard disk drive; an optical drive; a RAID device; a random-access memory (RAM); a read-only memory (ROM); and all forms of flash memory storage devices.

Network 14 may be connected to one or more secondary networks (e.g., network 18), examples of which may include but are not limited to: a local area network; a wide area network; or an intranet, for example.

Various IO requests (e.g. IO request 20) may be sent from client applications 22, 24, 26, 28 to storage system 12. Examples of IO request 20 may include but are not limited to data write requests (i.e. a request that content be written to storage system 12) and data read requests (i.e. a request that content be read from storage system 12).

The instruction sets and subroutines of client applications 22, 24, 26, 28, which may be stored on storage devices 30, 32, 34, 36 (respectively) coupled to client electronic devices 38, 40, 42, 44 (respectively), may be executed by one or more processors (not shown) and one or more memory architectures (not shown) incorporated into client electronic devices 38, 40, 42, 44 (respectively). Storage devices 30, 32, 34, 36 may include but are not limited to: hard disk drives; optical drives; RAID devices; random access memories (RAM); read-only memories (ROM), and all forms of flash memory storage devices. Examples of client electronic devices 38, 40, 42, 44 may include, but are not limited to, personal computer 38, laptop computer 40, smartphone 42, notebook computer 44, a server (not shown), a data-enabled, cellular telephone (not shown), and a dedicated network device (not shown).

Users 46, 48, 50, 52 may access storage system 12 directly through network 14 or through secondary network 18. Further, storage system 12 may be connected to network 14 through secondary network 18, as illustrated with link line 54.

The various client electronic devices may be directly or indirectly coupled to network 14 (or network 18). For example, personal computer 38 is shown directly coupled to network 14 via a hardwired network connection. Further, notebook computer 44 is shown directly coupled to network 18 via a hardwired network connection. Laptop computer 40 is shown wirelessly coupled to network 14 via wireless communication channel 56 established between laptop computer 40 and wireless access point (i.e., WAP) 58, which is shown directly coupled to network 14. WAP 58 may be, for example, an IEEE 802.11a, 802.11b, 802.11g, 802.11n, Wi-Fi, and/or Bluetooth device that is capable of establishing wireless communication channel 56 between laptop computer 40 and WAP 58. Smartphone 42 is shown wirelessly coupled to network 14 via wireless communication channel 60 established between smartphone 42 and cellular network/bridge 62, which is shown directly coupled to network 14.

Client electronic devices 38, 40, 42, 44 may each execute an operating system, examples of which may include but are not limited to Microsoft Windows™, Apple Macintosh™, Redhat Linux™, or a custom operating system.

For illustrative purposes, storage system 12 will be described as being a network-based storage system that includes a plurality of backend storage devices. However, this is for illustrative purposes only and is not intended to be a limitation of this disclosure, as other configurations are possible and are considered to be within the scope of this disclosure.

Figure 2:
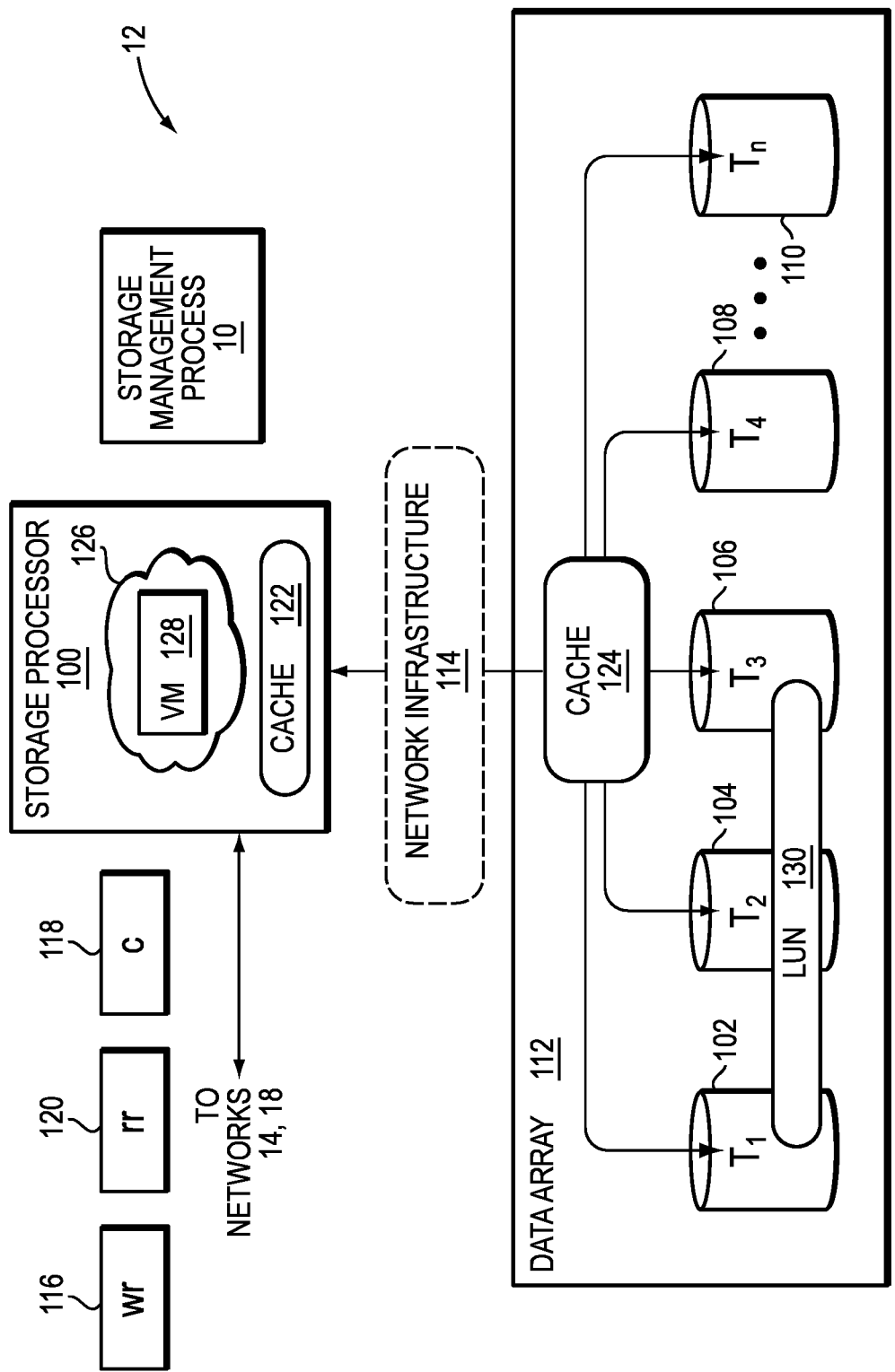
FIG. 2 is a diagrammatic view of another implementation of the storage system of FIG. 1.

Referring also to FIG. 2, there is shown one particular implementation of storage system 12. Storage system 12 may include storage processor 100 and a plurality of storage targets (e.g. storage targets 102, 104, 106, 108, 110). Storage targets 102, 104, 106, 108, 110 may be configured to provide various levels of performance and/or high availability. For example, one or more of storage targets 102, 104, 106, 108, 110 may be configured as a RAID 0 array, in which data is striped across storage targets. By striping data across a plurality of storage targets, improved performance may be realized. However, RAID 0 arrays do not provide a level of high availability. Accordingly, one or more of storage targets 102, 104, 106, 108, 110 may be configured as a RAID 1 array, in which data is mirrored between storage targets. By mirroring data between storage targets, a level of high availability is achieved as multiple copies of the data are stored within storage system 12.

While storage targets 102, 104, 106, 108, 110 are discussed above as being configured in a RAID 0 or RAID 1 array, this is for illustrative purposes only and is not intended to be a limitation of this disclosure, as other configurations are possible. For example, storage targets 102, 104, 106, 108, 110 may be configured as a RAID 3, RAID 4, RAID 5 or RAID 6 array.

While in this particular example, storage system 12 is shown to include five storage targets (e.g. storage targets 102, 104, 106, 108, 110), this is for illustrative purposes only and is not intended to be a limitation of this disclosure. Specifically, the actual number of storage targets may be increased or decreased depending upon e.g. the level of redundancy/performance/capacity required.

One or more of storage targets 102, 104, 106, 108, 110 may be configured to store coded data. As is known in the art, coded data may allow for the regeneration of data lost/corrupted on one or more of storage targets 102, 104, 106, 108, 110.

Examples of storage targets 102, 104, 106, 108, 110 may include one or more electro-mechanical hard disk drives and/or one or more solid-state/flash devices, wherein a combination of storage targets 102, 104, 106, 108, 110 and processing/control systems (not shown) may form data array 112.

The manner in which storage system 12 is implemented may vary depending upon e.g. the level of redundancy/performance/capacity required. For example, storage system 12 may be a RAID device in which storage processor 100 is a RAID controller card and storage targets 102, 104, 106, 108, 110 are individual "hot-swappable" hard disk drives. Another example of such a RAID device may include but is not limited to an NAS device. Alternatively, storage system 12 may be configured as a SAN, in which storage processor 100 may be e.g., a server computer and each of storage targets 102, 104, 106, 108, 110 may be a RAID device and/or computer-based hard disk drive. Further still, one or more of storage targets 102, 104, 106, 108, 110 may be a SAN.

In the event that storage system 12 is configured as a SAN, the various components of storage system 12 (e.g. storage processor 100, storage targets 102, 104, 106, 108, 110) may be coupled using network infrastructure 114, examples of which may include but are not limited to an Ethernet (e.g., Layer 2 or Layer 3) network, a fiber channel network, an InfiniBand network, or any other circuit switched/packet switched network.

The Storage Management Process:

Storage system 12 may execute all or a portion of storage management process 10. The instruction sets and subroutines of storage management process 10, which may be stored on a storage device (e.g., storage device 16) coupled to storage processor 100, may be executed by one or more processors (not shown) and one or more memory architectures (not shown) included within storage processor 100. Storage device 16 may include but is not limited to: a hard disk drive; an optical drive; a RAID device; a random-access memory (RAM); a read-only memory (ROM); and all forms of flash memory storage devices. Additionally, some or all of the instruction sets and subroutines of storage management process 10 may be executed by one or more processors (not shown) and one or more memory architectures (not shown) included within data array 112.

As discussed above, various JO requests (e.g. IO request 20) may be generated. For example, these IO requests may be sent from client applications 22, 24, 26, 28 to storage system 12. Additionally,/alternatively and when storage processor 100 is configured as an application server, these IO requests may be internally generated within storage processor 100. Examples of IO request 20 may include but are not limited to data write request 116 (i.e. a request that content 118 be written to storage system 12) and data read request 120 (i.e. a request that content 118 be read from storage system 12).

During operation of storage processor 100, content 118 to be written to storage system 12 may be processed by storage processor 100 and storage management process 10. Additionally,/alternatively and when storage processor 100 is configured as an application server, content 118 to be written to storage system 12 may be internally generated by storage processor 100.

Storage processor 100 may include frontend cache memory system 122. Examples of frontend cache memory system 122 may include but are not limited to a volatile, solid-state, cache memory system (e.g., a dynamic RAM cache memory system) and/or a non-volatile, solid-state, cache memory system (e.g., a flash-based, cache memory system).

Storage processor 100 and storage management process 10 may initially store content 118 within frontend cache memory system 122. Depending upon the manner in which frontend cache memory system 122 is configured, storage processor 100 and storage management process 10 may immediately write content 118 to data array 112 (if frontend cache memory system 122 is configured as a write-through cache) or may subsequently write content 118 to data array 112 (if frontend cache memory system 122 is configured as a write-back cache).

Data array 112 may include backend cache memory system 124. Examples of backend cache memory system 124 may include but are not limited to a volatile, solid-state, cache memory system (e.g., a dynamic RAM cache memory system) and/or a non-volatile, solid-state, cache memory system (e.g., a flash-based, cache memory system). During operation of data array 112, content 118 to be written to data array 112 may be received from storage processor 100. Data array 112 and storage management process 10 may initially store content 118 within backend cache memory system 124 prior to being stored on e.g. one or more of storage targets 102, 104, 106, 108, 110.

Depending on the manner in which storage system 12 is configured, storage system 12 may be configured to execute virtual machine operating environment 126. An example of virtual machine operating environment 126 may include but is not limited to a hypervisor, which is an instantiation of an operating/file system that may allow for one or more virtual machines (e.g., virtual machine 128) to operate within a single physical device. Accordingly, the combination of virtual machine operating environment 126 and virtual machine 128 may allow one or more users to access the resources of storage processor 100 (and one or more additional storage processors, not shown) and data array 112 (and one or more additional data arrays, not shown). Through the use or storage system 12 and/or virtual machine operating environment 126, one or more LUNs (e.g., LUN 130) may be defined and exposed to users.

As is known in the art, LUN is an acronym for Logical Unit Number, which is a unique identifier that may designate one or more physical or virtual storage devices that are configured to execute I/O commands on a host computer. Typically, a logical unit number (i.e., a LUN) is assigned when a host scans a SCSI device and discovers a logical unit, wherein the LUN may identify the specific logical unit to e.g., a SCSI initiator (not shown). Although (technically) the term LUN is only the identifying number of a logical unit, the IT industry commonly uses LUN as shorthand to refer to the logical unit itself.

While in this example, LUN 130 is a logical storage unit that is constructed from portions of storage targets 102, 104, 106, this is for illustrative purposes only and is not intended to be a limitation of this disclosure, as other configurations are possible and are considered to be within the scope of this disclosure. For example, LUN 130 may be a portion of a single storage target, an entire storage target, or portions of multiple storage targets. Accordingly, it is understood that LUN 130 may refer to an entire RAID set, a single storage target (or storage partition), or multiple storage targets (or storage partitions).

As discussed above, while in this particular example, storage system 12 is shown to include five storage targets (e.g. storage targets 102, 104, 106, 108, 110), this is for illustrative purposes only and is not intended to be a limitation of this disclosure, wherein the actual number of storage targets included within storage system 12 may be increased or decreased depending upon e.g. the level of redundancy/performance/capacity required. For example, data array 112 of storage system 12 may include dozens of storage targets that may be configured in a mapped RAID configuration.

As is known in the art, a RAID array may be configured in various fashions that may adhere to a RAID X (Y+Z) format, wherein: examples of X may include but are not limited to 5 and 6; examples of Y may include but are not limited to 6, 8, 12 and 14; and examples of Z include but are not limited to 1 and 2. Accordingly, some exemplary implementations of such a RAID array may include but are not limited to RAID 5 (4+1), RAID 5 (8+1), RAID 5 (12+1), RAID 6 (6+2), RAID 6 (8+2), and RAID 6 (14+2). Additionally, it is understood that the above-listed configurations are meant to be illustrative only and not all inclusive. Therefore, different drive counts/combinations (e.g. fewer or more) may be utilized for RAID 5 and RAID 6 configurations and/or different RAID configurations (e.g., RAID 1) may be utilized.

As is known in the art, in a traditional RAID system, the number of storage targets in the system may be defined by the configuration of the RAID array. So, if the RAID array is configured in a RAID 5 (4+1) fashion (i.e., four data drives and one parity drive), the system may include five storage targets. However, in a mapped RAID system, the number of storage targets in the system is not limited by the configuration of the RAID array. Accordingly, data array 112 may e.g., include dozens of storage targets and may still be configured in e.g., a RAID 5 (4+1) configuration.

Figure 3:
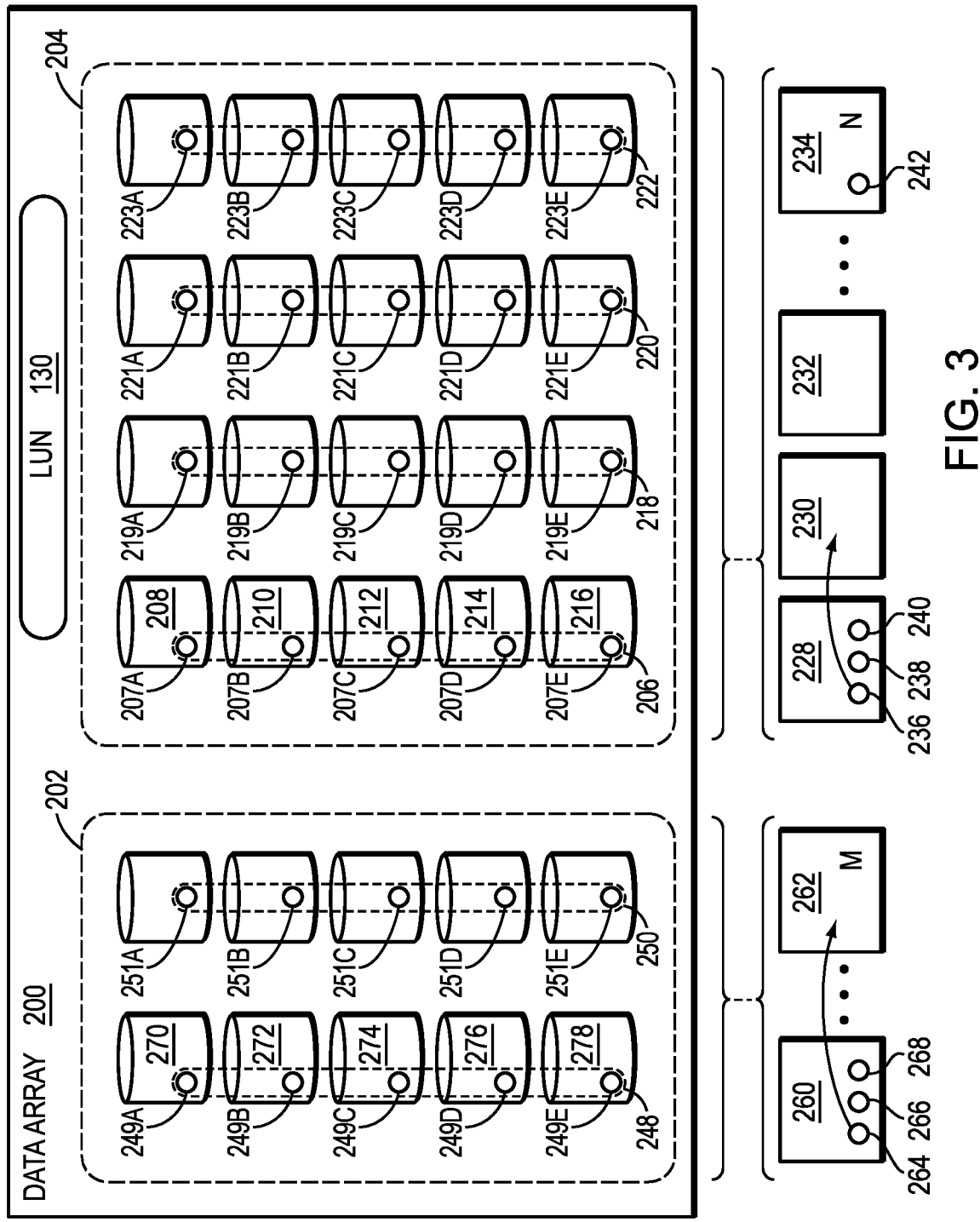
FIG. 3 is a diagrammatic view of a portion of the storage system of FIG. 1.

Referring also to FIG. 3, there is shown one implementation of such a data array, wherein data array 200 is shown to include thirty storage targets. As is known in the art, the storage targets included within a data array may be grouped into different performance tiers. As discussed above, the various storage targets included within storage system 12 may include one or more electro-mechanical hard disk drives (which tend to have comparatively lower performance) and/or one or more solid-state/flash devices (which tend to have comparatively higher performance). Accordingly, data array 200 may be divided into a plurality of performance tiers (e.g., higher performance tier 202 and lower performance tier 204). While data array 200 is shown to include two performance tiers, this is for illustrative purposes only and is not intended to be a limitation of this disclosure, as other configuration are possible and are considered to be within the scope of this disclosure. For example, additional performance tiers may be added to further compartmentalize data array 200.

In this particular example, the ten storage targets shown to be included within higher performance tier 202 may be solid-state/flash devices (which tend to have comparatively higher performance) and/or the twenty storage targets shown to be included within lower performance tier 204 may be electro-mechanical hard disk drives (which tend to have comparatively lower performance). Accordingly, data that is frequently accessed within storage system 12 may be stored within higher performance tier 202, while data that is infrequently accessed within storage system 12 may be stored within lower performance tier 204.

At the physical layer, the storage targets included within storage system 12 may be divided into a plurality of drive extents (e.g., portions), wherein each of these drive extents may have a capacity of 40-50 gigabytes, for example and without limitation. In alternate embodiments, drive extents could be 25 gigabytes, 100 gigabytes, and other suitable sizes known to those in the art without affecting the functionality of embodiments herein. So, if a storage target has a capacity of 5.0 terabytes, this storage target may include 100 drive extents that each have a capacity of 50 gigabytes. Accordingly, and in such a situation, the twenty storage targets included within lower performance tier 204 my cumulatively include 2,000 (100×20) drive extents.

The drive extents included within e.g., lower performance tier 204 may be uniquely grouped to form RAID extents. While the following discussion concerns higher performance tier 202 and lower performance tier 204 being configured in a RAID 5 (4+1) fashion, this is for illustrative purposes only and is not intended to be a limitation of this disclosure, as other configurations are possible and are considered to be within the scope of this disclosure. For example, higher performance tier 202 and lower performance tier 204 may be configured in various fashions that may adhere to a RAID X (Y+Z) format.

Accordingly, and for this example of a RAID 5 (4+1) configuration, five unique drive extents may be configured to form a single RAID extent, wherein the individual drive extents included within a RAID extent are from different storage targets and are only used in one RAID extent (i.e., a drive extent cannot be used in multiple RAID extents). For example, RAID extent 206 may be constructed using a drive extent (e.g., drive extents 207A, 207B, 207C, 207D, 207E) from each of storage targets 208, 210, 212, 214, 216, (respectively). This forming of RAID extents may be repeated until 400 RAID extents are formed from the 2,000 drive extents included within e.g., lower performance tier 204. Accordingly: RAID extent 218 may be constructed using drive extents 219A, 219B, 219C, 219D, 219E); RAID extent 220 may be constructed using drive extents 221A, 221B, 221C, 221D, 221E); and RAID extent 222 may be constructed using drive extents 223A, 223B, 223C, 223D, 223E). As discussed above, storage system 12 may be configured to execute virtual machine operating environment 126 (e.g., a hypervisor), wherein one or more LUNs (e.g., LUN 130) may be defined and exposed to users. As discussed above, a LUN is a logical representation of physical storage space. For example, and through the use of a LUN, physical storage that is scattered across multiple storage targets that may be located in a single or disparate locations may appear to the user as a single storage target.

Accordingly, and in order to allow for the utilization of such LUNs, storage management process 10 may be configured to allow for the mapping of such logical storage (e.g., LUN 130) to physical storage (e.g., a drive extent within a storage target). Just as physical storage space (e.g., a storage target) is divided into a plurality of smaller portions (e.g., drive extents), logical storage space (e.g., a LUN) is divided into a plurality of smaller portions (e.g., data slices), wherein each of these data slices may have a capacity of e.g., 256 megabytes and may be mapped to underlying drive extents within the storage targets of (in this example) lower performance tier 204. Specifically, these data slices may be broken down into data stripes that have a common data capacity (e.g., 16 kilobytes, 32 kilobytes, 64 kilobytes, 128 kilobytes, 256 kilobytes or 512 kilobytes).

Figure 4:
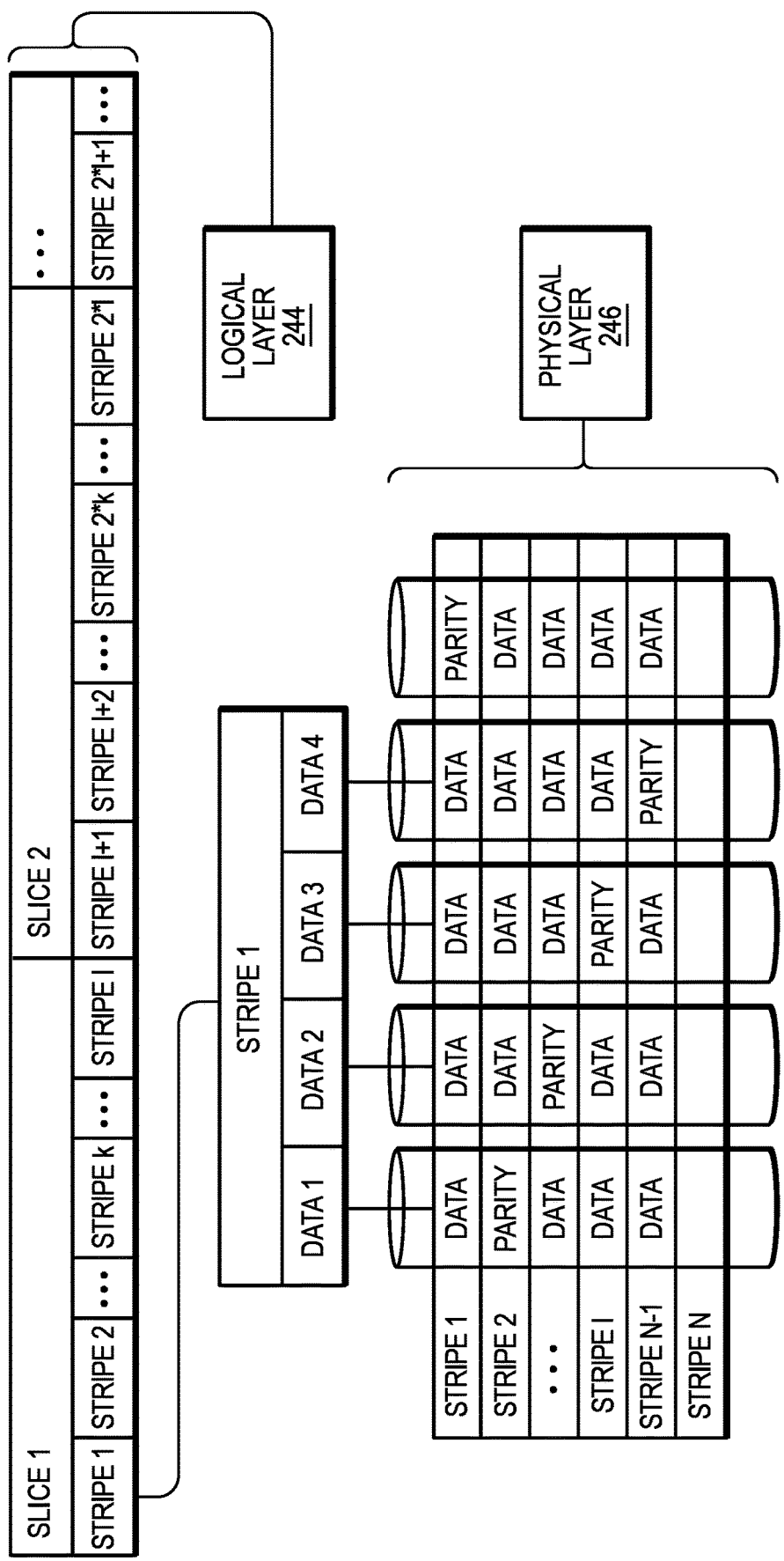
FIG. 4 is a diagrammatic view of a portion of the storage system of FIG. 1.

For example, and for illustrative purposes only, a 256-kilobyte data stripe for use within a RAID 5 (4+1) system may include four 64 kilobyte data segments and one 64 kilobytes parity segment (for a total of five segments) that would each be mapped to a distinct drive extent included with a RAID extent (as shown in FIG. 4). Accordingly, and in this example, the five segments within a data stripe (e.g., four data segments and one parity segment) may be mapped to the five drive segments within a RAID segment, thus resulting in each of the five segments within a data stripe being written to a distinct storage target. So if a 256 kilobyte data stripe associated with LUN 130 was mapped to RAID extent 206, the first 64 kilobyte data segment may be written to drive extent 207A within storage target 208, the second 64 kilobyte data segment may be written to drive extent 207B within storage target 210, the third 64 kilobyte data segment may be written to drive extent 207C within storage target 212, the fourth 64 kilobyte data segment may be written to drive extent 207D within storage target 214, and the fifth 64 kilobyte parity segment may be written to drive extent 207E within storage target 216.

And when mapping data slices onto storage targets (e.g., the storage targets included within higher performance tier 202 and/or lower performance tier 204), the first 256 kilobyte data stripe of the 256 megabyte data slice may be written to a first RAID extent (which spans five storage targets) . . . and the next 256 kilobyte data stripe of the 256 megabyte data slice may be written to a second RAID extent (which also spans five storage targets) . . . and the next 256 kilobyte data stripe of the 256 megabyte data slice may be written to a third RAID extent (which also spans five storage targets) . . . and so on for 1,000 iterations until the entire 256 megabyte data slice is written to various RAID extents within storage system 12. So being that a 256-megabyte data slice may be written to e.g., higher performance tier 202 and/or lower performance tier 204 as 1,000 separate 256 kilobyte data stripes that are stored on 1,000 separate RAID extents included in higher performance tier 202 and/or lower performance tier 204, it is foreseeable that a single data slice may be spread across every storage target within higher performance tier 202 and/or lower performance tier 204. In alternate mappings, all stripes of a slice could be in the same RAID extent. In yet alternate mappings, a slice may be mapped to a subset of the drives. This type of configuration is sometimes referred to as a "rotation subgroup."

Unfortunately, and as could be imagined, certain portions of the data stored within higher performance tier 202 and/or lower performance tier 204 may be accessed more frequently than other portions of the stored data. Accordingly, IO load imbalances may occur. For example, assume that the storage targets within lower performance tier 204 are capable of processing 500 input/output operations per second (IOPS). In the event that a storage target (or a portion thereof such as a drive extent) is overloaded and asked to provide e.g., 1,000 IOPS, delays may occur and performance may suffer. However, in the event that only a portion of the storage targets within e.g., lower performance tier 204 are overloaded, some of the load experienced by the overloaded storage targets may be transferred in an attempt to balance the load across a larger cross-section of e.g., lower performance tier 204.

While an overload condition is described above as occurring when a specified level of IOPS is exceeded for a storage target, this is for illustrative purposes only and is not intended to be a limitation of this disclosure, as other configurations are possible and are considered to be within the scope of this disclosure. For example, an overload condition may be defined as exceeding a certain write load by a certain threshold. For example, an overload condition may be defined as a storage target exceeding an average write load (in megabytes per second) by a defined percentage (e.g., 10%).

Accordingly, and at the physical layer, if one or more drive extents within a storage target are heavily loaded, some or all of those heavily loaded drive extents may be moved to a storage target that is not as heavily loaded. Alternatively, and at the logical layer, if one or more drive extents within a storage target are heavily loaded, some or all of the data slices mapped to those heavily loaded drive extents may be remapped to other drive extents that are not as heavily loaded.

Storage management process 10 may be configured to manage wear balancing in a mapped RAID storage system. In preferred embodiments, it is desirable to get the maximum amount of performance out of each storage disk within storage system 12 by improving wear distribution across disk extents. Disk extents can vary in size and in number from one physical storage disk to another. The disk extents are the physical storage spaces used to create mapped RAID extents.

The wear balancing contemplated in these embodiments could be implemented when new drives are added to storage system 12, when used drives are added to storage system 12, or when new storage pools are created from either used storage drives, new storage drives, or a combination thereof. Storage system 12 is comprised of numerous physical storage drives. Each drive is partitioned into a number of disk extents. Disk extents can vary in size and in number from one physical storage drive to another. Disk extents are the physical storage spaces used to create mapped RAID extents.

One of the challenges of wear balancing in the mapped RAID environment is the fact that RAID groups can be comprised of disk extents from myriad physical disks. In order to overcome this, we disclose methods, systems, and non-transitory computer products for grouping RAID extents having similar wear levels together within a RAID group. In some embodiments, the RAID group can be formed at the outset using these teachings or when additional storage is added to an existing mapped RAID group. In additional embodiments, we continue to monitor endurance parameters of disk extents, RAID extents, and/or RAID groups in order to provide ongoing wear balancing.

Figure 6:
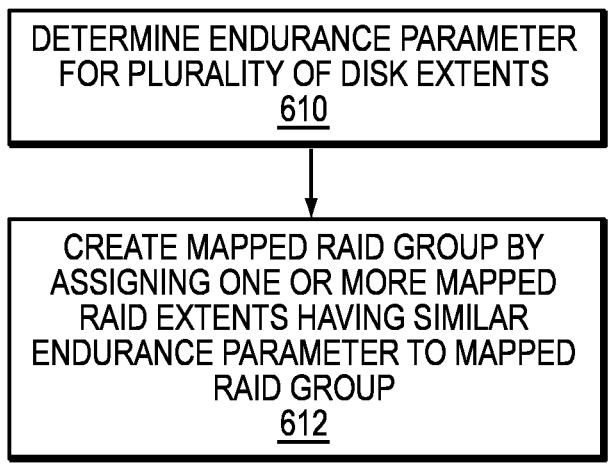
FIG. 6 is a flow chart of the storage management process of FIG. 1.
Figure 7:
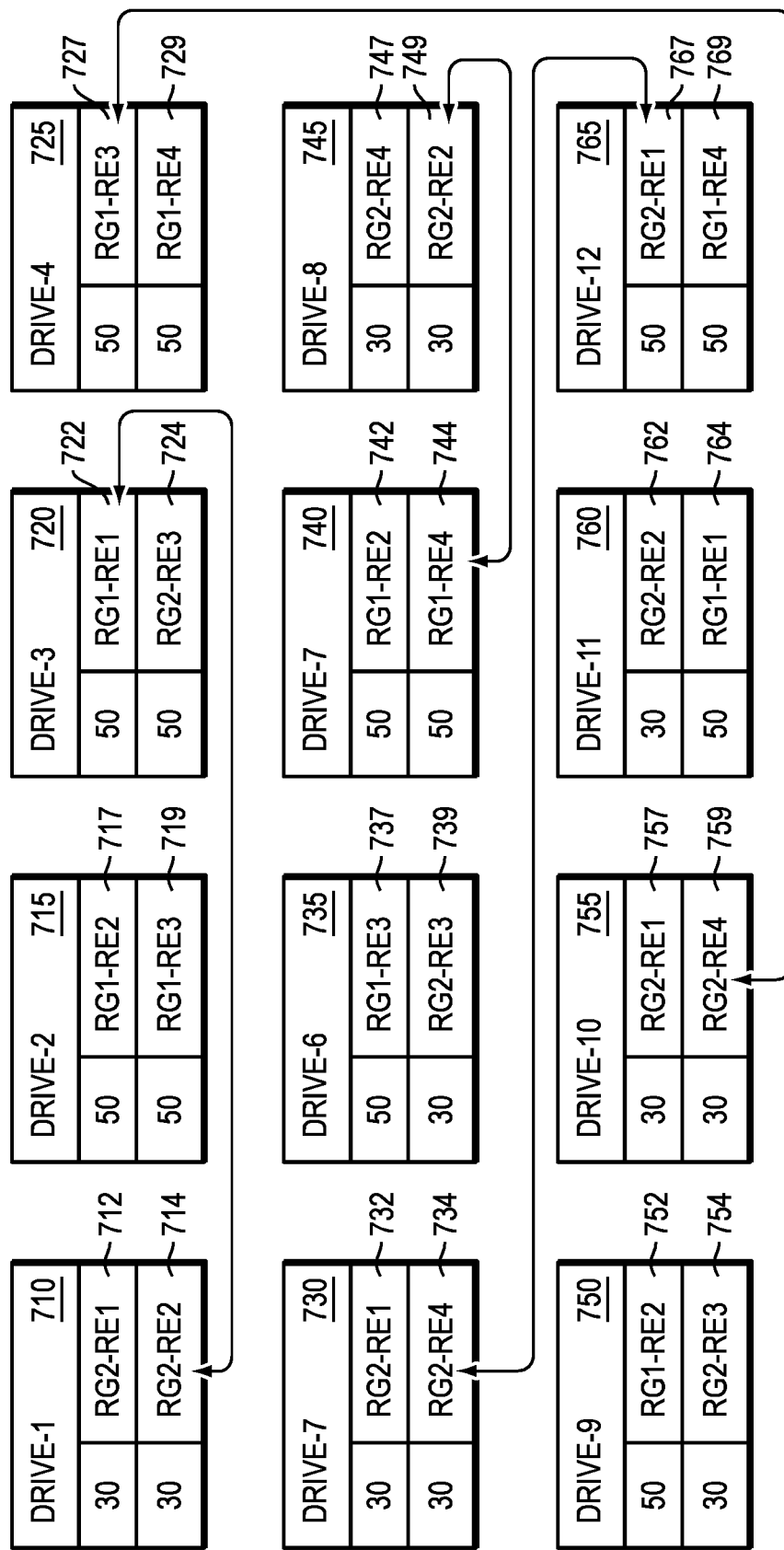
FIG. 7 is a diagrammatic view of a portion of a mapped RAID storage system according to embodiments.

FIGS. 5-7 illustrate an exemplary use case. FIG. 5 shows two mapped RAID groups, RG1 and RG2, comprised of four (4) RAID extents each, RE1-RE4. In this illustrative use case, we show how wear balancing can be performed for an established mapped RAID storage system. The teachings, however, are equally applicable to the use cases of creating a mapped RAID group as well as adding additional storage to existing mapped RAID groups.

The two mapped RAID groups, RG1 and RG2, of FIG. 5 reside on disk extents spanning twelve (12) disk drives 510, 515, 520, 525, 530, 535, 540, 545, 550, 555, 560, 565, each of which has two disk extents per drive. Each disk extent has a certain write capability. Specifically, drive 510 has disk extents 512 and 514, each of which has a write capability of 30. Drive 515 has disk extents 517 and 519, each of which has a write capability of 50. Drive 520 has disk extents 522 and 524, each of which has a write capability of 40. Drive 525 has disk extents 527 and 529, each of which has a write capability of 50. Drive 530 has disk extents 532 and 534, each of which has a write capability of 30. Drive 535 has disk extents 537 and 539, each of which has a write capability of 40. Drive 540 has disk extents 542 and 544, each of which has a write capability of 50. Drive 545 has disk extents 547 and 549, each of which has a write capability of 30. Drive 550 has disk extents 552 and 554, each of which has a write capability of 40. Drive 555 has disk extents 557 and 559, each of which has a write capability of 30. Drive 560 has disk extents 562 and 564, each of which has a write capability of 40. Drive 565 has disk extents 567 and 569, each of which has a write capability of 50.

In embodiments, it is desirable to balance wear across some or all of a RAID group. One way to do this is to determine 610 an endurance parameter for one or more disk extents. Wear balancing can be achieved by creating 612 mapped RAID groups by assigning one or more mapped RAID extents having similar endurance parameters to the mapped RAID group being balanced. In our use case, we could use write capability as an endurance parameter around which to perform wear balancing.

FIG. 7 depicts application of these teachings. In FIG. 7 we show the same twelve disk drives after an embodiment of the wear balancing techniques has been applied. These twelve drives are shown as 710, 715, 720, 725, 730, 735, 740, 745, 750, 755, 760, and 765. Each drive contains two disk extents, namely 712, 714, 717, 719, 722, 724, 727, 729, 732, 734, 737, 739, 742, 744, 747, 749, 752, 754, 757, 759, 762, 764, 767, and 769.

In FIG. 7, we balance wear by moving RAID extents belonging to RG1 to disk extents having a write capability of 50. We also move RAID extents belonging to RG2 to disk extents having a write capability of 30. Specifically, the disk extents housing RG2, RE2 714 and RG1, RE1 722 are swapped. The disk extents containing RG1, RE3 727 switches places with disk extent containing RG2, RE4 759. The disk extent associated with RG2, RE4 734 switches physical locations with disk extent for RG1, RE1 767. And the disk extent for RG1, RE4 744 is swapped with the disk extent for RG2, RE2 749.

In this embodiment, write capabilities on drives 720, 735, 750, and 760 are reapportioned in an unequal fashion in order to ensure that RAID extents belonging to RG1 all have a similar write capability, namely 50. Likewise, that RAID extents belonging to RG2 also have a similar write capability, namely 30. In these embodiments, we achieve better wear balance and better write performance because, in general, the write load targeted for a given RE is based on its constituent disk extent having the lowest write capability. For example, an RE whose component disk extents have a write capability rating of 30, 40, and 50 is generally given a write capability rating value as though all of its disk extents have a write capability rating of 30.

In these embodiments, we determine when wear balancing would be beneficial by monitoring endurance parameters associated with the physical drives in the mapped RAID storage systems. In these embodiments, we measure one or more endurance parameters attendant to the physical disks, which are themselves divided into multiple disk extents. Some of these endurance parameters, without limitation could be: a write capability value, a maximum number of erase cycles, a manufacturer specified maximum wear value, a current total of erase cycles, a total time the disk extent has been in service, a total number of "power-on" hours, a wear rate, which could take into account a current wear rate as a function of a total life expectancy for the disk, a desired life expectancy, a total number of write operations performed on a disk, a total number of disk extents per disk, a total number of read operations performed on a disk, environmental conditions for a disk as a function of time (for example, operating temperature, room temperature, humidity, atmospheric pressure, air quality, seismic activity, power outages, and the like).

Endurance parameters could be measured and analyzed by a machine learning module 11, which in some embodiments could be internal to storage management process 10. In alternate embodiments, machine learning module 11 could be a stand-alone processor, a cloud compute function, an app, or any artificial intelligence computer communicatively coupled to storage system 12. The machine learning module 11 could monitor and analyze heuristic data, such as endurance parameters, associated with storage system 12.

Endurance parameters are useful in several respects. First, they give an indication of when wear balancing should be performed. Second, they indicate where wear balancing should be performed. Third, endurance parameters can be used to assign mapped RAID extents, which are comprised of disk extents, having similar wear to RAID group. Fourth, past endurance parameters can be used to make predictions about future performance of, and demands placed on, storage system 12.

In some instances, endurance parameters may apply to entire disks and not be as granular as per disk extent within a particular disk. In these instances, embodiments could apportion wear at the disk extent level evenly across the drive, or proportionally based on predictive analytics such as the relative size of the disk extent, or the relative activity of the disk extent.

In embodiments, we monitor endurance parameters for physical drives, disk extents, RAID extents, and RAID groups in order to manage 341 wear within the mapped RAID groups comprising the storage system 12. If there is an imbalance within a RAID group, we move a set of logical data portions from a first mapped RAID group to another mapped RAID group.

In alternate embodiments, logical data portions could be moved to different mapped RAID groups based on a predicted number of write operations that will occur in the future, or a predicted number of erase operations, or a predicted number of read operations and the like. These predictions could be made by machine learning module 11.

General:

As will be appreciated by one skilled in the art, the present disclosure may be embodied as a method, a system, or a computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product on a computer-usable storage medium having computer-usable program code embodied in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. The computer-usable or computer-readable medium may also be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Computer program code for carrying out operations of the present disclosure may be written in an object-oriented programming language such as Java, Smalltalk, C++ or the like. However, the computer program code for carrying out operations of the present disclosure may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network/a wide area network/the Internet (e.g., network 14).

The present disclosure is described with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, may be implemented by computer program instructions. These computer program instructions may be provided to a processor of a general-purpose computer/special purpose computer/other programmable data processing apparatus, such that the instructions, which execute via the processor of the computer or other programmable data processing apparatus, create means for implementing the functions/acts specified in the flowchart and/or block diagram block or blocks.

These computer program instructions may also be stored in a computer-readable memory that may direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The flowcharts and block diagrams in the figures may illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

A number of implementations have been described. Having thus described the disclosure of the present application in detail and by reference to embodiments thereof, it will be apparent that modifications and variations are possible without departing from the scope of the disclosure defined in the appended claims.

What is claimed is:

1. A method for use in managing wear balancing in mapped RAID storage systems, the method comprising:
    determining an endurance parameter for a plurality of disk extents in a mapped RAID storage system, wherein one or more disk extents comprises a mapped RAID extent;
    managing a mapped RAID group by locating one or more RAID extents within the mapped RAID group of disk extents having a similar endurance parameter;
    determining a predicted number of write operations for the one or more RAID extents within the mapped RAID group of disk extents having a similar endurance parameter;
    creating a RAID group using the one or more RAID extents within the mapped RAID group having a similar endurance parameter and a similar predicted write capability; and
    reapportioning in an unequal fashion a write capability of one or more disk drives in order to create the RAID group.

2. The method of claim 1, further comprising determining if an endurance parameter for a disk extent should be reapportioned.

3. The method of claim 1, further comprising monitoring the endurance parameter for one or more of the plurality of disk extents.

4. The method of claim 1, wherein the endurance parameter is one or more of: a write capability value, a maximum number of erase cycles, a manufacturer specified maximum wear value, a current total of erase cycles, a total time the disk extent has been in service, a total number of power-on hours, a wear rate, a desired life expectancy, a total number of write operations performed on a disk, a total number of disk extents per disk, a total number of read operations performed on a disk, an operating temperature for a disk, a room temperature for a location in which a disk is stored, a humidity level for a location in which a disk is stored, an atmospheric pressure for a location in which a disk is stored, an air quality for a location in which a disk is stored, a seismic activity for a location in which a disk is stored, or a power outage value for a location in which a disk is stored.

5. The method of claim 1, wherein locating one or more RAID extents within the mapped RAID group on disk extents having a similar endurance parameter is further based on a predicted endurance parameter.

6. The method of claim 5, wherein the predicted endurance parameter is determined using a machine learning module.

7. A system for use in managing wear balancing in mapped RAID storage systems, the system comprising a processor configured to:
    determine an endurance parameter for a plurality of disk extents in a mapped RAID storage system, wherein one or more disk extents comprises a mapped RAID extent;
    manage a mapped RAID group by locating one or more RAID extents within the mapped RAID group of disk extents having a similar endurance parameter;
    determine a predicted number of write operations for the one or more RAID extents within the mapped RAID group of disk extents having a similar endurance parameter;
    create a RAID group using the one or more RAID extents within the mapped RAID group having a similar endurance parameter and a similar predicted write capability; and
    reapportion in an unequal fashion a write capability of one or more disk drives in order to create the RAID group.

8. The system of claim 7, further configured to determine if an endurance parameter for a disk extent should be reapportioned.

9. The system of claim 7, further configured to monitor the endurance parameter for one or more of the plurality of disk extents.

10. The system of claim 7, wherein the endurance parameter is one or more of: a write capability value, a maximum number of erase cycles, a manufacturer specified maximum wear value, a current total of erase cycles, a total time the disk extent has been in service, a total number of power-on hours, a wear rate, a desired life expectancy, a total number of write operations performed on a disk, a total number of disk extents per disk, a total number of read operations performed on a disk, an operating temperature for a disk, a room temperature for a location in which a disk is stored, a humidity level for a location in which a disk is stored, an atmospheric pressure for a location in which a disk is stored, an air quality for a location in which a disk is stored, a seismic activity for a location in which a disk is stored, or a power outage value for a location in which a disk is stored.

11. The system of claim 7, wherein locating one or more RAID extents within the mapped RAID group on disk extents having a similar endurance parameter is further based on a predicted endurance parameter.

12. The system of claim 11, wherein the predicted endurance parameter is determined using a machine learning module.

13. A non-transitory computer readable medium with program instructions stored thereon for performing the following acts:
   determine an endurance parameter for a plurality of disk extents in a mapped RAID storage system, wherein one or more disk extents comprises a mapped RAID extent;
   manage a mapped RAID group by locating one or more RAID extents within the mapped RAID group of disk extents having a similar endurance parameter determine a predicted number of write operations for the one or more RAID extents within the mapped RAID group of disk extents having a similar endurance parameter;
   create a RAID group using the one or more RAID extents within the mapped RAID group having a similar endurance parameter and a similar predicted write capability; and
   reapportion in an unequal fashion a write capability of one or more disk drives in order to create the RAID group.

14. The non-transitory computer medium of claim 13, further configured to determine if an endurance parameter for a disk extent should be reapportioned.

15. The non-transitory computer medium of claim 13, further configured to monitor the endurance parameter for one or more of the plurality of disk extents.

16. The non-transitory computer medium of claim 13, wherein the endurance parameter is one or more of: a write capability value, a maximum number of erase cycles, a manufacturer specified maximum wear value, a current total of erase cycles, a total time the disk extent has been in service, a total number of power-on hours, a wear rate, a desired life expectancy, a total number of write operations performed on a disk, a total number of disk extents per disk, a total number of read operations performed on a disk, an operating temperature for a disk, a room temperature for a location in which a disk is stored, a humidity level for a location in which a disk is stored, an atmospheric pressure for a location in which a disk is stored, an air quality for a location in which a disk is stored, a seismic activity for a location in which a disk is stored, or a power outage value for a location in which a disk is stored.

17. The non-transitory computer medium of claim 13, wherein locating one or more RAID extents within the mapped RAID group on disk extents having a similar endurance parameter is further based on a predicted endurance parameter.

18. The non-transitory computer medium of claim 17, wherein the predicted endurance parameter is determined using a machine learning module.

* * * * *